(12) United States Patent
Gupta et al.

(10) Patent No.: US 12,015,517 B2
(45) Date of Patent: Jun. 18, 2024

(54) ROOT CAUSE ANALYSIS FOR OPERATIONAL ISSUES USING A RULES MINING ALGORITHM

(71) Applicant: Arista Networks, Inc., Santa Clara, CA (US)

(72) Inventors: Karan Gupta, Maharashtra (IN); Rikith Reddy Bachu, Hyderabad (IN); Abhishek Singh, Uttar Pradesh (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/339,117

(22) Filed: Jun. 21, 2023

(65) Prior Publication Data

US 2023/0336403 A1 Oct. 19, 2023

Related U.S. Application Data

(63) Continuation of application No. 17/685,640, filed on Mar. 3, 2022, now Pat. No. 11,722,358.

(51) Int. Cl.
*H04L 41/0631* (2022.01)
*G06N 5/025* (2023.01)

(52) U.S. Cl.
CPC ......... *H04L 41/0631* (2013.01); *G06N 5/025* (2013.01)

(58) Field of Classification Search
CPC ............................ H04L 41/0631; G06N 5/025
USPC .......................................................... 709/224
See application file for complete search history.

(56) References Cited

U.S. PATENT DOCUMENTS

| | | | | |
|---|---|---|---|---|
| 11,159,386 B2* | 10/2021 | Finn, II | ................. | H04L 43/045 |
| 11,494,255 B2* | 11/2022 | Wang | ................. | G06F 11/0709 |
| 11,627,033 B2* | 4/2023 | Umakanth | .......... | H04L 43/0823 |
| | | | | 709/224 |
| 11,695,618 B2* | 7/2023 | Tiwari | ................... | G06N 10/00 |
| | | | | 709/224 |
| 11,700,192 B2* | 7/2023 | Mackie | ................... | H04L 43/16 |
| | | | | 709/224 |
| 11,722,358 B1* | 8/2023 | Gupta | ................ | H04L 41/0631 |
| | | | | 709/224 |
| 11,774,944 B2* | 10/2023 | Cella | ...................... | G06N 20/00 |
| | | | | 700/275 |
| 11,829,233 B2* | 11/2023 | Watkins | .............. | G06F 11/3409 |
| 11,838,171 B2* | 12/2023 | Ml | .......... | H04L 41/22 |
| 11,887,465 B2* | 1/2024 | Ghosh | .................. | G05B 23/027 |
| 2020/0379871 A1* | 12/2020 | Prakash | ................. | G06F 11/366 |
| 2021/0273846 A1* | 9/2021 | Chaparala | ............... | H04L 41/16 |
| 2022/0086036 A1* | 3/2022 | Wang | .................. | H04L 41/0636 |

(Continued)

FOREIGN PATENT DOCUMENTS

| | | | | |
|---|---|---|---|---|
| AU | 2021102593 A4 * | 7/2021 | | |
| CN | 115720186 A * | 2/2023 | | |
| EP | 4236242 A2 * | 8/2023 | ......... | H04L 41/0654 |

*Primary Examiner* — Melvin H Pollack
(74) *Attorney, Agent, or Firm* — Sprinkle IP Law Group

(57) ABSTRACT

In general, embodiments relate to a method, for managing a network, that includes determining an occurrence of an operational issue on a network device of the network, based on the determining, executing an encoding phase and a causal feature identification phase on a feature database, wherein the feature database is associated with the operational issue, identifying a plurality of potential root causes using the encoding phase and the causal feature identification phase, and performing an action based on the plurality of potential root causes.

18 Claims, 6 Drawing Sheets

(56) References Cited

U.S. PATENT DOCUMENTS

2022/0247620 A1\* 8/2022 Phan Vu ................. H04L 41/16
2022/0327172 A1\* 10/2022 Davies .................. G06F 16/285
2022/0334904 A1\* 10/2022 Chesneau ........... G06F 11/0793
2022/0382615 A1\* 12/2022 Turk ..................... G06F 11/079
2023/0188409 A1\* 6/2023 Wang ....................... G06N 7/01
709/224

\* cited by examiner

Standardized Database 300

| | High Interference (X0) | High data transfer retry rate (X1) | Low RSSI Level (X2) | High contention rate (X3) | Low Data rate (Y) |
|---|---|---|---|---|---|
| Network device A | 1 | 0 | 0 | 1 | 1 |
| Network device B | 1 | 1 | 1 | 0 | 1 |
| Network device C | 0 | 1 | 0 | 0 | 0 |

Set of Processed Entries 302

| Antecedents | Consequents | Antecedent Support | Consequent Support | Lift Value |
|---|---|---|---|---|
| X1, X2 | Y | 0.00 | 0.67 | 0.8 |
| X1, X3 | Y | 0.33 | 0.67 | 1.2 |
| X2, X3 | Y | 0.33 | 0.67 | 1.1 |
| X0, X1, X2 | Y | 0.00 | 0.67 | 0.4 |
| ... | ... | ... | ... | ... |
| X2, X3 | X1 | 0.3 | 0.67 | 1.5 |

FIG. 3A

| Filtered Set of Processed Entries with F-Scores 304 | | | |
|---|---|---|---|
| Antecedents | Consequents | Lift | F-Score |
| X1, X3 | Y | 1.2 | 0.6 |
| X2, X3 | Y | 1.1 | 0.3 |

| Set of Causal Features 308 |
|---|
| X1, X3 |

FIG. 3B

ROOT CAUSE ANALYSIS FOR OPERATIONAL ISSUES USING A RULES MINING ALGORITHM

CROSS-REFERENCE TO RELATED APPLICATION(S)

This application is a continuation of, and claims a benefit of priority under 35 U.S.C. 120 from, U.S. patent application Ser. No. 17/685,640, filed Mar. 3, 2022, issued as U.S. Pat. No. 11,722,358, entitled "ROOT CAUSE ANALYSIS FOR OPERATIONAL ISSUES USING A RULES MINING ALGORITHM," which is fully incorporated by reference herein for all purposes.

BACKGROUND

Network devices in a network may include functionality for transmitting packets between each other and other devices in a network. Based on any number of factors relating to the network, the network devices in the network may experience operational issues.

BRIEF DESCRIPTION OF DRAWINGS

FIGS. 3A-3C show an example in accordance with one or more embodiments described herein.

DETAILED DESCRIPTION

Figure 1:
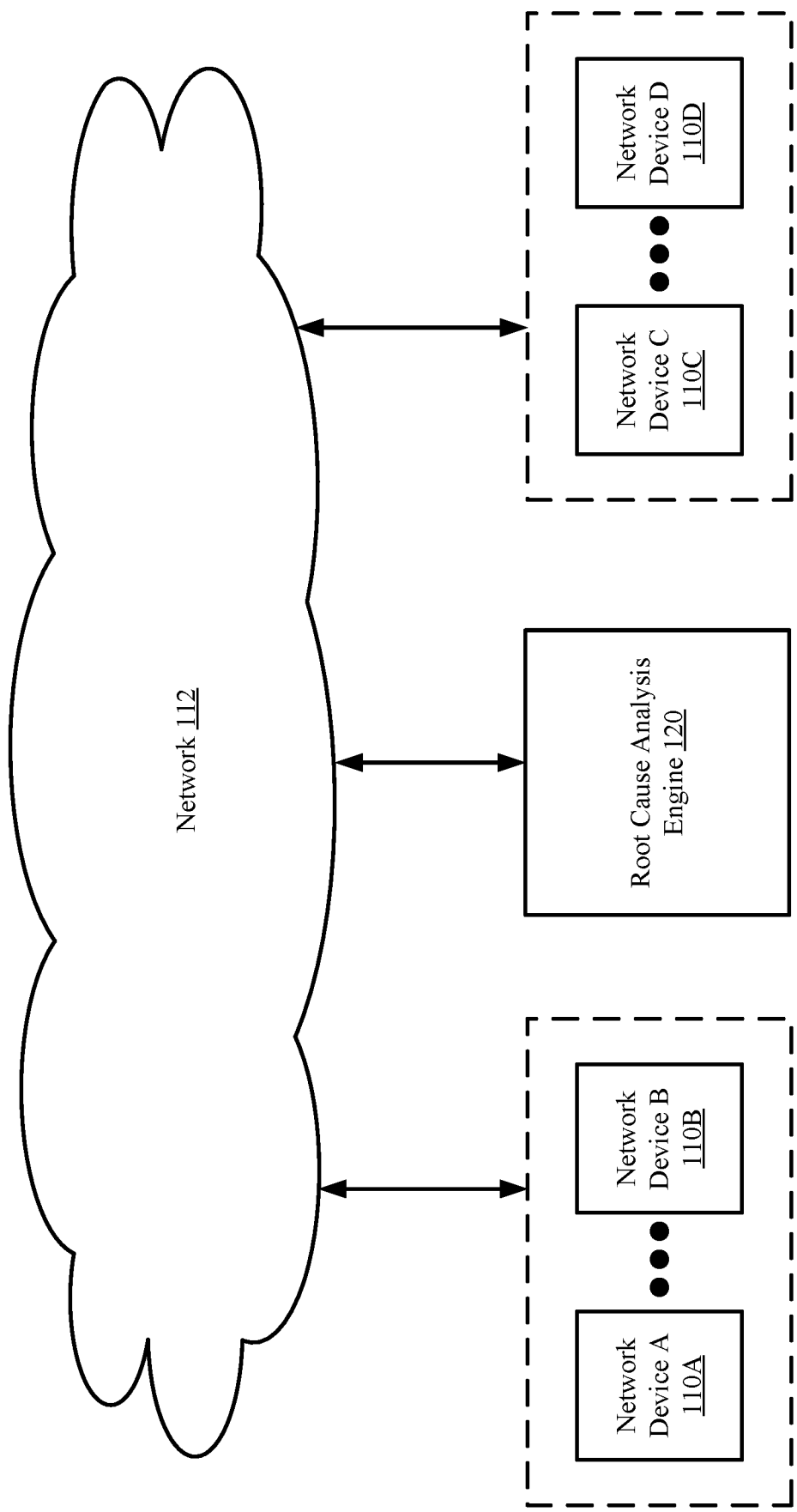
FIG. 1 shows a diagram of a system in accordance with one or more embodiments.

During operation of a network that includes any number of network devices in which network traffic operates, any operational issues (or failures) may occur (e.g., a network device attempting to connect to the network fails in its attempt to connect). To resolve an operational failure, it may be beneficial to identify a cause of such issues. Identifying a cause (also referred to as a root cause) of an operational failure may be difficult given a large number of features that may be taken into account.

Embodiments of the disclosure relate to a method for generating a standardized database that includes a set of features to identify a subset of such features that may have a high probability of causing a given operational issue. Embodiments disclosed herein relate to a root cause analysis for processing the standardized database using a database of standardized entries.

The identification of the root cause(s) may include two phases: (i) an encoding phase and (ii) causal feature identification phase. These potential root causes are then provided to the administrator and/or used by the network device to initiate self-healing.

The following describes embodiments of the two phases used to identify the root causes.

Encoding Phase

In one or more embodiments, each of the standardized entries relates to an instance in which a network device attempts to connect to and/or is connected to a network. Each standardized entry may include a set of features, which each feature corresponds to a configuration feature and/or a behavioral feature (e.g., network bandwidth, data transfer retry rate, received signal strength indicator (RSSI) levels, location of access point, etc.). Each feature in the standardized entries may be represented by a standardized value. The standardized value may be, for example, a Boolean value (e.g., either 1 or 0). The standardized entry may further include a symptomatic value (which may be a Boolean value), which represents whether an operational issue occurred during the corresponding instance. The standardized database may include any number of standardized entries.

In one or more embodiments, the root cause analysis method includes functionality to encode raw values from the network device into a standardized entry. The encoding includes applying the conditions to the known configuration features and/or behavioral features of the network device, network, or other entities for each corresponding instance in the database. As an example, a condition may include whether a network bandwidth (i.e., the raw value of network bandwidth) of the network device is within a predefined range. In this example, if the network bandwidth is within the predefined range, the output (i.e., the value of the feature) is 1; otherwise, the output is 0.

TABLE 1

Example standardized database

| X0 | X1 | X2 | ... | Xn | Y |
|----|----|----|-----|----|---|
| 1  | 0  | 0  | ... | 1  | 0 |
| 1  | 1  | 0  | ... | 0  | 1 |
| 0  | 1  | 0  | ... | 0  | 0 |

The table above is a non-limiting example standardized database. Each row corresponds to a standardized entry. Each column labeled with an X (e.g., X0, X1, etc.) relates to a feature. The column labeled with a Y relates to a symptomatic value.

Causal Feature Identification Phase

In one or more embodiments, following the standardization of the database, each subset of features is evaluated for each standardized entry in relation to the corresponding symptomatic value. The evaluation may include applying an association rule mining algorithm such as, for example, an apriori algorithm, to each subset in relation to the symptomatic value. The apriori algorithm includes generating support, confidence, and lift values that each correspond to a relationship between a subset of one or more features and the symptomatic value of a standardized entry. The result may be a set of processed entries that each correspond to: a subset of features for a standardized entry, a symptomatic value for the entry, antecedent support, consequent support, a confidence value, and a lift value.

While this disclosure discusses the use of an apriori algorithm, embodiments disclosed herein may utilize other association rule learning mechanisms. Other such mechanisms may include, but are not limited to, an equivalence class transformation (ECLAT) algorithm, a frequent pattern growth (FP-growth) algorithm, a multi-relation association rules (MRAR) learning mechanism, and a contrast set learning mechanism.

In one or more embodiments, the set of processed entries generated using the apriori algorithm is further filtered based upon whether they relate to a positive correlation between the corresponding subset of features and the symptomatic values. For example, a lift value greater than one may indicate that the corresponding subset of features positively correlates with the symptomatic value. In this example, the set of processed entries are filtered to only include such processed entries associated with a lift value greater than one. Additional examples of filtering mechanisms performed on the processed entries may include a cosine similarity measurement between a processed entry and a predetermined set of values, and a Kulczynski measure between two or more processed entries. Other filtering mechanisms may be applied without departing from the technology. The result of the filtering may include a set of filtered entries.

In one or more embodiments, the F-score is computed for each of the filtered entries. The F-score is a value that further describes the relationship between the subset of features of a filtered entry and its corresponding symptomatic value. Following the generation of the F-scores, an F-score threshold is determined.

In one or more embodiments, the F-score threshold is determined by applying a threshold algorithm. The threshold algorithm may include assigning a dummy variable to each of the processed entries. The dummy variable may be a Boolean value that is randomly assigned (e.g., randomly assigned a one or randomly assigned a zero) to each processed entry. A distribution analysis is performed on the processed entries based on the relationship between the value of the corresponding dummy variables and the symptomatic values. The distribution analysis includes calculating the instances in which the processed entries yield true positives, false positives, and false negatives.

In one or more embodiments, a true positive relate to an instance in which a processed entry specifies a dummy variable of one and a symptomatic value of one; a false positive relates to an instance in which a processed entry specifies a dummy variable of one and a symptomatic value of false (represented e.g., by a value of zero); and a false negative relates to an instance in which a processed entry specifies a dummy variable of zero and a symptomatic value of one. The calculated number of instances for each and the calculated probability of each of these occurring is used to generate weighted values. The weighted values are applied to a set of corresponding F-scores to obtain a weighted average F-score and standard deviation. Based on the weighted average F-score and standard deviation, the F-score threshold is determined. For example, the F-score threshold is a predetermined number of standard deviations above or below the weighted average F-score.

In one or more embodiments, the set of filtered entries are further filtered to determine a set of contending entries. The contending entries may be a subset of the filtered entries that are associated with an F-score that meets or exceeds the F-score threshold. Each contending entry may be associated with a subset of features. The identified subsets of features may be used to perform a corrective action of the symptom.

In one or more embodiments, the root cause analysis is executed by a root cause analysis engine.

The root cause analysis engine may be executed on the network devices experiencing operational issues. Alternatively, the root cause analysis engine may be executing on an external system connected to the network that obtains the symptom.

Various embodiments of the disclosure are described below.

FIG. 1 shows a system in accordance with one or more embodiments of the disclosure. As shown in FIG. 1, the system includes a network (112) that includes one or more network devices (110A, 110B, 110C, 110D). Further, the system includes a root cause analysis engine (120). Each of these components is operatively connected via any combination of wired and/or wireless connections without departing from the disclosure. The system may include additional, fewer, and/or different components without departing from the disclosure. Each of the aforementioned components illustrated in FIG. 1A is described below.

In one or more embodiments, each of the network devices (e.g., 110A, 110B, 110C, 110D) includes functionality to receive packets at any of the physical network interfaces (e.g., ports) of the network device and to process the packets. In one or more embodiments, the network device includes functionality for transmitting packets between network devices (110A, 110B, 110C, 110D) and/or between components in a network device (110A, 110B, 110C, 110D). The process of receiving packets, processing the packets, and transmitting the packets may be in accordance with, at least in part, FIG. 2.

In one or more embodiments, one or more of the network devices (110A, 110B, 110C, 110D) may experience operational issues. The operational issues may include, for example, a frequent failure to transmit packets, receive packets, a slow transmission of packets, connect to the network (112), or failure to perform any other functionality of the network devices (110A, 110B, 110C, 110D) without departing from the disclosure. The operational issues may result in a decrease in efficiency of the network (112) as a whole.

In one or more embodiments, it may be advantageous to identify the causes of the operational issues for the purpose of remediating the operational issues and providing an efficient operation of the network. To identify the causes of the operational issues, the network (112) may include a root cause analysis engine (120). In one or more embodiments, the root cause analysis engine (120) includes functionality for performing a root cause analysis on the network devices (110A, 110B, 110C, 110D) by obtaining information regarding the network devices (110A, 110B, 110C, 110D), applying an encoding phase on the information to obtain a standardized database, and applying a causal feature relation phase on the standardized database to obtain a set of features that are determined to cause an operational issue experienced by one or more of the network devices (110A, 110B, 110C, 110D). In one or more embodiments, the encoding phase and the causal relation phase is performed in accordance with FIG. 2.

In one or more embodiments, to obtain the information regarding the network devices (110A, 110B, 110C, 110D), the root cause analysis engine (120) monitors the configuration and performance of the network devices (110A, 110B, 110C, 110D). The monitoring may include sending requests for information from the network devices (110A, 110B, 110C, 110D). The requests may be sent, for example, periodically. As a second example, the network devices (110A, 110B, 110C, 110D) may send their corresponding information at any intervals without obtaining the requests. Alternatively, the requests may be sent in response to any indication by the root cause analysis engine (120) that an operational issue is experienced by one or more of the network devices. The information obtained from the network devices (110A, 110B, 110C, 110D) may indicate whether one or more of the network devices are experiencing the operational issues. For example, if one of the network devices (110A, 110B, 110C, 110D) sends a notification to the root cause analysis engine (120) that the network device is experiencing an operational issue, the root cause analysis engine (120) may respond by sending requests to all network devices (110A, 110B, 110C, 110D) that specify obtaining the information.

While this disclosure discusses the use of a root cause analysis engine (120) for performing the identifying and/or otherwise detecting an issue, embodiments disclosed may utilize alternative entities that perform the detection. For example, the root cause analysis engine (120) may communicate with an anomaly detection engine (not shown) to perform the detection. For example, the anomaly detection engine may detect the operational issue in one or more network devices. In response to the detection, the anomaly detection engine may send a notification to the root cause analysis engine (120) to perform the functionality of the root cause analysis engine discussed in FIG. 2.

Figure 4:
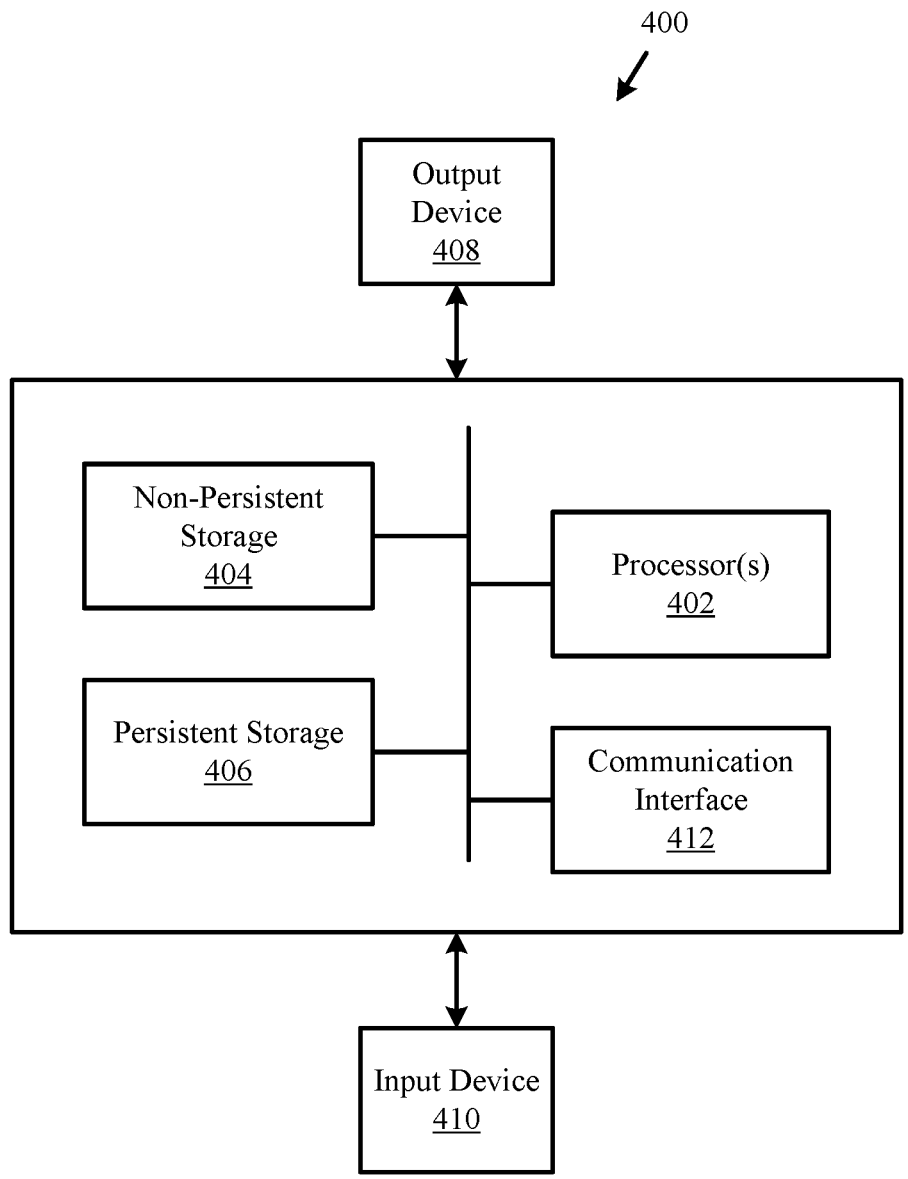
FIG. 4 shows a diagram of a computing device in accordance with one or more embodiments described herein.

In one or more embodiments, the root cause analysis engine (120) is implemented as a computing device (see, e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the root cause analysis engine (120) described throughout this application.

In one or more embodiments disclosed herein, the root cause analysis engine (120) is implemented as a logical device. The logical device may utilize the computing resources of any number of computing devices and thereby provide the functionality of the root cause analysis engine (120) described throughout this application.

While the root cause analysis engine (120) is illustrated as a separate component, the root cause analysis engine (120) may be implemented as a network device (110A, 110B, 110C, 110D). Alternatively, the root cause analysis engine (120) may be implemented as computing instructions implemented by the network device (110A, 110B, 110C, 110D) that cause the network device to provide the functionality of the root cause analysis engine (120) disclosed throughout this application.

In one embodiment of the disclosure, the one or more network device(s) (110A, 110B, 110C, 110D) are physical devices (not shown) that include persistent storage, memory (e.g., random access memory), one or more processor(s), network device hardware (including a switch chip(s), line cards, etc.), and one or more physical ports. In one embodiment of the disclosure, the network device is hardware that determines which egress port on a network device to forward media access control (MAC) frames. Each physical port may or may not be connected to another device (e.g., a client device, another network device) on the network (112). The network device (or more specifically the network device hardware) may be configured to receive packets via the ports and determine whether to: (i) drop the packet; (ii) process the packet in accordance with one or more embodiments of the disclosure; and/or (iii) send the packet, based on the processing, out from another port on the network device. While the aforementioned description is directed to network devices that support Ethernet communication, the disclosure is not limited to Ethernet; rather, the disclosure may be applied to network devices using other communication protocols.

Figure 2:
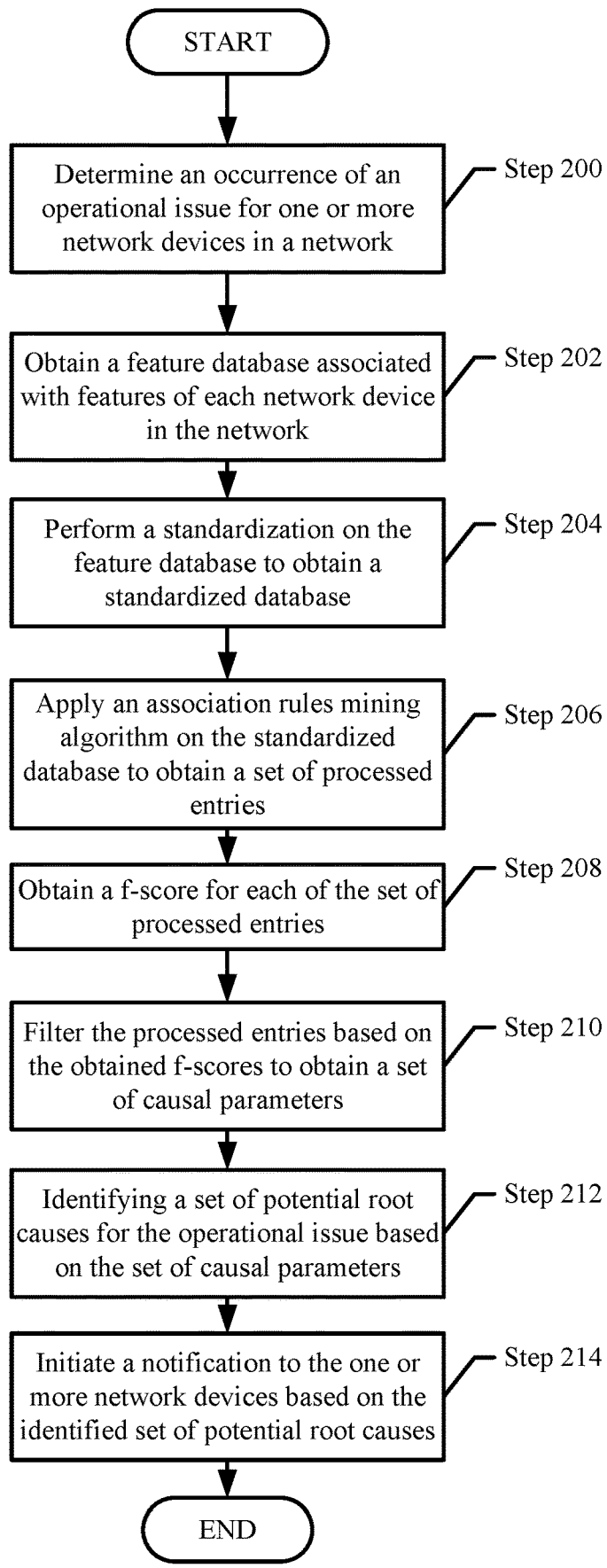
FIG. 2 shows a flowchart for a method for determining root causes for operational issues in a network in accordance with one or more embodiments.

FIG. 2 shows a flowchart for a method for determining root causes for operational issues in a network in accordance with one or more embodiments. The method of FIG. 2 may be performed by, for example, the root cause analysis engine (e.g., 120, FIG. 1). Other components illustrated in FIG. 1 may perform the method of FIG. 2 without departing from the disclosure.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, the root cause analysis engine determines an occurrence of an operational issue for one or more network devices in a network. In one or more embodiments, the occurrence is determined based on one or more notifications obtained that specify the operational issue. In another embodiment, the occurrence may be determined by the root cause analysis engine based on monitoring that detects a network connection failure between the root cause analysis engine and the one or more network devices. In another embodiment, the root cause analysis engine may determine the presence of an operational issue on a given network device based on a remote monitoring of the given network device.

In step 202, a feature database associated with features of each network device in the network is obtained. In one or more embodiments, the feature database is a data structure that specifies features of the network devices in the network. The features may be behavioral features or configuration features. The feature database may be organized on a per-network device basis. For example, the feature database may be a set of entries each corresponding to one of the network devices. Each entry may specify a value for each feature associated with the network device. Further, the entry may specify whether the network device experiences the operational issue. The feature database may include one or more entries for each of the network devices for a period of time. For example, one entry may correspond to the features of a network device at one point in time. A second entry may correspond to the features of the network device at a point in time that is 15 minutes later.

In one or more embodiments, a behavior feature of a network device is a feature that specifies an aspect of the performance of the network device. Examples of behavioral features may include, but are not limited to, a data transfer retry rate (e.g., a rate in which data has to be resent to a second network device), a read rate of data in the network device, a received signal strength indicator (RSSI) level, a high contention rate (e.g., a rate of users attempting to utilize a given network device for network traffic), and a network bandwidth.

In one or more embodiments, a configuration feature of a network device is a feature that specifies a configuration of the network device. Examples of configuration features include, but are not limited to, a geographical location of the network device, a number of resources (e.g., ASICs) implementing on the network device, and an operating system version of the network device.

In one or more embodiments, the root cause analysis engine performs an encoding phase and a causal feature identification phase on the feature database. The encoding phase may include the standardization described in step 204. The causal feature identification phase may include an association rules mining algorithm, a generation of an F-score, and a filtering on a processed set of entries.

In step 204, a standardization is performed on the feature database to obtain a standardized database. In one or more embodiments, the standardization is a portion of the encoding phase. The standardization may include setting a Boolean value (e.g., a 1 or a 0) for each of the features in each entry of the feature database. The result may be a standardized entry that specifies standardized values for each feature of the standardized entries. The Boolean value may be based on whether the feature meets a condition. The condition may be, for example, a range of values. For example, if the feature is a network bandwidth, the condition may be a range of 0 to 1 gigabits per second (GBPS). If the network bandwidth of the network device meets the condition, the standardized value may be 1 for the corresponding feature. The result of the standardization is a standardized database that includes a set of standardized entries. Each standardized entry may include the set of features of the feature database, where each feature corresponds to a Boolean value based on the conditions applied to the features of the feature database. Further, each standardized entry includes a symptomatic feature that relates to a Boolean value assigned based on whether the corresponding network device experiences the operational issue.

In step 206, an association rules mining algorithm is performed on the standardized database to obtain a set of processed entries. In one or more embodiments, the association rules mining algorithm is a process that measures the associations between each of the features in the standardized database. The association rules mining algorithm may include generating relational entries that each correspond to a unique grouping of features that are considered antecedents and one feature that is considered the consequent. Each relational entry may further include relational values regarding the relationship between the set of features in the set antecedents and the consequents based on the frequency in which their values in the feature database are set to 1. For example, consider a standardized database that includes features labeled X0, X1, and X2. One relational entry may include antecedents that specify X0 and X1, and one consequent that includes X2. The relational values of the relational entries may correspond to the causal relationship between the antecedents X0 and X1 and the consequent X2. The causal relationship may be represented by the likelihood that the antecedents caused the consequent.

For example, the association rules mining algorithm may be an apriori algorithm. The apriori algorithm may include relational values regarding the relationships. In this example, the relational values may correspond to: (i) an antecedent support that describes a probability that each feature in the antecedents of the relational entry are 1, (ii) a consequent support that describes a probability that the consequent is 1, (iii) a support that describes a probability that all features in the antecedent and the consequent are 1, (iv) a confidence that describes a ratio between the support and the antecedent support, and (v) a lift value that describes a ratio between the confidence and the consequent support.

While the relational entries may include any features as the consequents, filtering may be performed to only include such relational entries that include the symptomatic feature as the consequent. The filtered relational entries may be referred to as the set of processed entries. In this matter, the processed entries each include a description of a unique relationship between a group of features and the symptomatic feature. In one or more embodiments, the set of processed entries may be further filtered based on the relational values (e.g., the antecedent support, the consequent support, the support, the confidence, and the lift value). For example, the remaining set of processed entries include only those that specify a lift value that is greater than 1.

To clarify aspects disclosed herein, while the standardized entries each relate to a network device of the network, the processed entries described above each relate to a set of features. The features may be described as a potential cause for the operational issue. The likelihood of a set of potential causes being related to the symptomatic feature (e.g., related to the operational issue) is analyzed in the remainder of the causal feature identification phase.

In step 208, a F-score is obtained for each of the sets of processed entries. In one or more embodiments, the F-score is a value that processes the relational values of a processed entry to obtain a value that describes a certainty that the group of features of the processed entry caused the symptomatic feature. In one or more embodiments, the F-score is calculated mathematically using the relational values generated using the apriori algorithm. The F-score may be calculated using the following equation:

$$F1(S_i, Y) = \frac{2 * conf(S_i, Y) * sup(S_i)}{sup\ sup\ (S_i) + sup(Y)}$$

In the above equation, $F1(S_i,Y)$ relates to the F-score for a processed entry that includes a grouping of features $S_i$ and a symptomatic value Y. Further, $conf(S_i,Y)$ relates to the confidence of the processed entry, $sup(S_i)$ relates to the antecedent support of the processed entry, and $sup(Y)$ relates to the consequent support.

In step 210, the processed entries are filtered based on the obtained F-scores to obtain a set of causal features. In one or more embodiments, the processed entries are filtered by obtaining an F-score threshold. The F-score threshold is obtained by performing threshold algorithm.

In one or more embodiments, the threshold algorithm may include assigning a dummy variable to each of the processed entries. The dummy variable may be a Boolean value that is randomly assigned (e.g., randomly assigned a one or randomly assigned a zero) to each processed entry. A distribution analysis is performed on the processed entries based on the relationship between the value of the corresponding dummy variables and the symptomatic values. The distribution analysis includes calculating the instances in which the processed entries yield true positives, false positives, and false negatives.

In one or more embodiments, a true positive corresponds to an instance in which a processed entry specifies a dummy variable of one and a symptomatic value of one; a false positive corresponds to an instance in which a processed entry specifies a dummy variable of one and a symptomatic value of false (represented e.g., by a value of zero); and a false negative corresponds to an instance in which a processed entry specifies a dummy variable of zero and a symptomatic value of one. The calculated number of instances for each and the calculated probability of each of these occurring is used to generate weighted values. The weighted values are applied to a set of corresponding F-scores to obtain a weighted average F-score and standard deviation. Based on the weighted average F-score and standard deviation, the F-score threshold is determined. For example, the F-score threshold is a predetermined number of standard deviations above or below the weighted average F-score.

In one or more embodiments, following the determination of the F-score threshold, the processed entries are further filtered based on whether the corresponding F-scores meet or exceed the F-score threshold. By comparing the F-score of a processed entry to the F-score threshold, embodiments identify whether a group of features are highly likely to have caused the operational issue. Further, the F-score comparison may reduce the likelihood of selecting a relationship between a group of features that occurred by happenstance. The processed entries for which the corresponding F-scores meet or exceed the F-score threshold are included in a set of contending entries. The group of features corresponding to each of the set of contending entries are included in the set of causal features.

In step 212, a set of potential root causes for the operational issue is identified based on the set of causal features. In one or more embodiments, the set of potential root causes are identified based on the collective group of features specified in the set of causal features. For example, if a feature corresponds to a value that corresponds to whether a network device is experiencing high interference, then a causal feature includes a high interference.

In step 214, a notification is initiated to the one or more network devices based on the identified set of potential root causes. In one or more embodiments, an action is performed to remediate the operational issue for each of the network devices. The action may be performed by the root cause analysis engine. The action may include, for example, sending an electronic notification (e.g., an electronic alert) to the one or more network devices. Alternatively, the action includes sending the notification to an administrator of the network. In one or more embodiments, the notification may be presented as an electronic mail (e-mail) message, a short message service (SMS) text message, and/or a multimedia message service (MMS) message.

In one or more embodiments, the notification specifies the operational issue, the identified set of potential root causes, and the network devices that experienced the operational issue. Further, the notification may include the feature database, the standardized database, the processed set of entries, and/or any other information generated in the method of FIG. 2 without departing from this disclosure.

In one or more embodiments, the action includes sending a request to the network device to perform a corrective action that includes remediating the operational issue by the network device. The request may specify the identified set of potential root causes and the solution for resolving such potential root causes. The request may further specify performing the solutions on the network device to resolve the operational issue.

Example

Figure 3C:
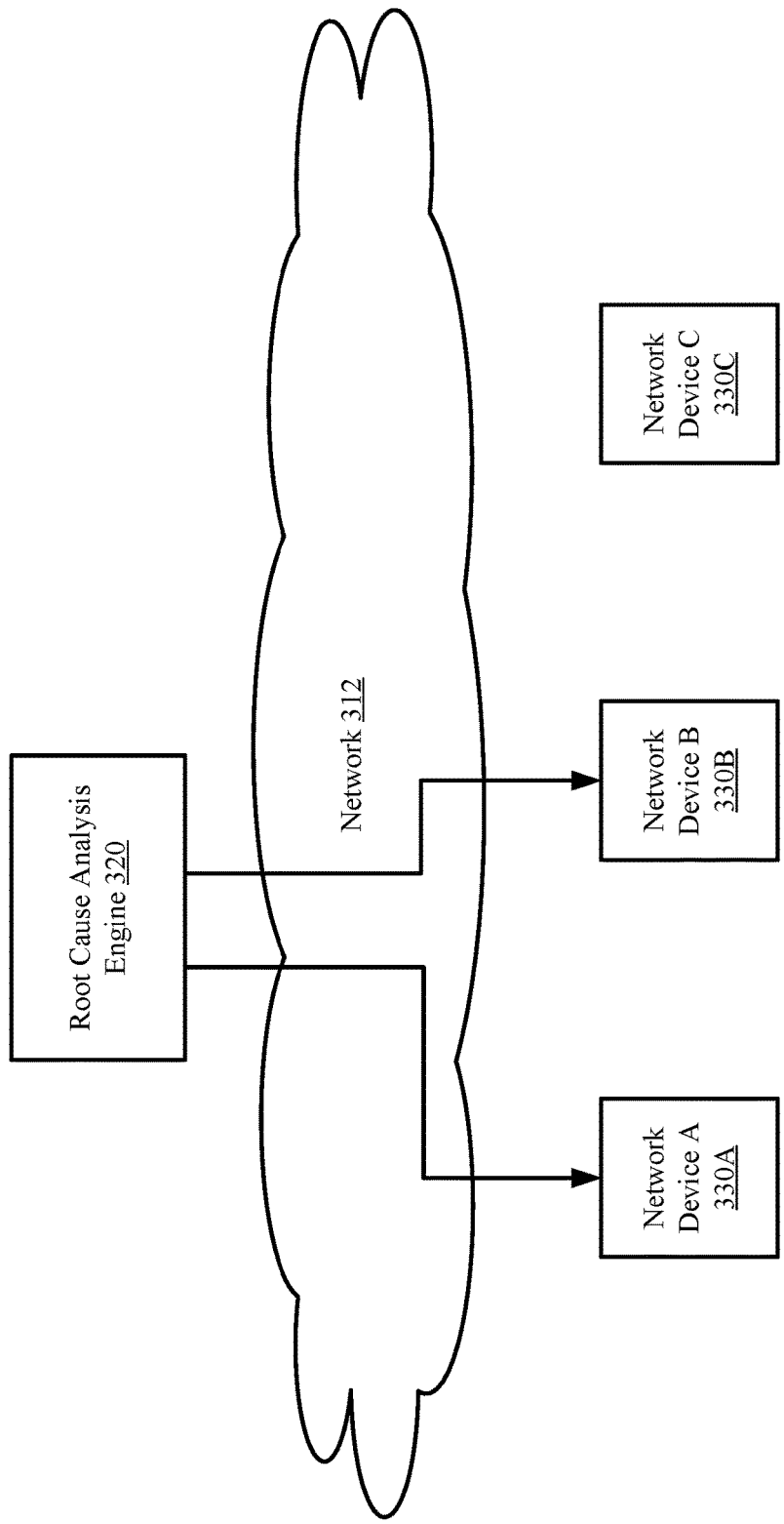

This section describes an example in accordance with one or more embodiments. The example, shown in FIGS. 3A-3C is not intended to limit the scope of this disclosure. Turning to the example, consider a scenario in which a network includes three network devices, and two of the network devices experience a low data rate.

FIG. 3A shows a diagram of a standardized database (300). The standardized database (300) includes three entries each corresponding to one of the three network devices. Each entry specifies a standardized value that corresponds to a feature. Each feature corresponds to a potential candidate for a root cause of the symptomatic feature labeled with Y (e.g., low data rate). The features include a high interference labeled with X0, a high data transfer retry rate labeled with X1, a low RSSI level labeled with X2, and a high contention rate labeled with X3.

The standardized database (300) is generated by the root cause analysis engine. The standardized database (300) is generated using information obtained by the root cause analysis engine corresponding to the three network devices (i.e., network device A, network device B, network device C). The information is obtained to generate a feature database. A standardization is performed on the feature database to generate a set of standardized values (e.g., Boolean values) that correspond to a feature for each network device. The result of the standardization is the standardized database (300). Though only network devices A and B experience the operational issue, the information corresponding to network device C is obtained to determine the causal features of the operational issue. For example, a feature associated with network device C may be used to determine whether such feature caused the operational issue on network device B and network device C.

The method of FIG. 2 is applied to the standardized database (300) to obtain the set of processed entries (302). The set of processed entries (302) includes a grouping of one or more features. For example, the grouping consisting of X1 and X2 corresponds to a first grouping of features, X2 and X3 consist of a second grouping of features, etc. Each grouping of features is a set of antecedents. Each processed entry includes a consequent. The consequent may be one of the other features (i.e., one or X0, X1, X2, X3) or the symptomatic feature Y. The apriori algorithm is applied to the antecedents and the consequents to obtain relational values such as antecedent support, consequent support, and a lift value. For the sake of brevity, not all relational values are illustrated in FIG. 3A. Further, for the sake of this example, the values illustrated in FIG. 3A may not correspond to actual calculated values.

Continuing with the example, the root cause analysis engine (not shown in FIG. 3A) filters the set of processed entries (302) based on both the lift value and the consequents. Specifically, the set of processed entries (302) are filtered to remove such entries that do not include the symptomatic feature Y and do not have a lift value higher than 1. In this example, the processed entries (302) that include a consequent of X1, or any other consequent not shown in FIG. 3A, are filtered out. Further, the processed entries illustrated in FIG. 3A to include a lift value of 0.8 and 0.4 are filtered out. As such, only the second and third processed entry of the set of processed entries (302) illustrated in FIG. 3A remain after the aforementioned filtering.

FIG. 3B shows a diagram of a filtered set of processed entries with F-scores (304). The F-scores are generated in accordance with the methods discussed in FIG. 2. A threshold algorithm is performed on the F-scores based on the values of the standardized dataset (300) to determine a F-score threshold. For the sake of brevity, the F-score threshold is determined to be 0.5. Using the F-score threshold, the root cause analysis engine determines that X1 and X3 correspond to the processed entry with a F-score that exceeds that threshold. Based on this determination, the set of causal features (308) are determined to be X1 and X3, which relate to a high data transfer retry rate and a high contention rate, respectively. As such, based on the analysis performed that includes the association rules mining algorithm and the filtering, it is determined that the operational issue of a low read rate is caused by the high data transfer retry rate and the high contention rate.

Turning to FIG. 3C, FIG. 3C shows a diagram of the example system. The example system includes the root cause analysis engine (320). The root cause analysis engine (320) sends a notification to the two network devices (i.e., network device A (330A) and network device B (330B)) that experienced the low read rate. The notification includes the set of causal features (308). Because network device C (330C) did not experience an operational issue, the root cause analysis engine (320) does not notify network device C (330C).

After receiving the notification, network devices A and B (330A, 330B) begin to remediate the operational issue. Because the notification indicates the low data rate is caused by a high contention rate, the network devices (330A, 330B) may attempt to remediate the high contention rate. The attempt includes, for example, reducing the number of clients connecting to the network devices (330A, 330B). This attempt may further reduce the high data transfer retry rate, as there would be fewer users attempting to transfer data through the network devices (330A, 330B).

End of Example

As discussed above, embodiments of the disclosure may be implemented using computing devices. FIG. 4 shows a diagram of a computing device in accordance with one or more embodiments of the disclosure. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the disclosure, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the disclosure, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein allow for the operation of monitoring and/or otherwise managing a network. Specifically, embodiments disclosed herein enable a root cause analysis engine to obtain information about the network devices in a network, determine which network devices are experiencing an operational issue, and processing the information to determine a likely cause to the operational issue. The determination of the cause of the operational issue may be beneficial to the improvement of the network overall by reacting in a timely manner to remediate the operational issues.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network, the method comprising:

obtaining a standardized database, wherein the standardized database comprises standardized entries corresponding to an occurrence of an operational issue, each standardized entry is associated with a corresponding network device and comprises standard values for each feature of that standardized entry, and the standard value for a feature is generated by comparison of a raw value associated with that standardized entry for that feature to a condition associated with that feature;

identifying a potential root cause for the operational issue on a network device based on the standardized database; and performing an action based on the identified potential root causes.

2. The method of claim 1, wherein each standardized entry comprises a symptomatic feature having a value assigned based on an occurrence of the operational issue in the network device corresponding to that standardized entry.

3. The method of claim 1, further comprising detecting the operational issue on the network device and identifying the potential root cause based on the detection of the operational issue.

4. The method of claim 1, wherein each of the features is a behavioral feature or a configuration feature.

5. The method of claim 1, wherein identifying a potential root cause on the network device comprises performing rule mining on the standardized database.

6. The method of claim 5, wherein the rule mining comprises association rule mining.

7. A system, comprising:
a processor; and
a non-transitory computer readable medium, comprising instructions for:
obtaining a standardized database, wherein the standardized database comprises standardized entries corresponding to an occurrence of an operational issue, each standardized entry is associated with a corresponding network device and comprises standard values for each feature of that standardized entry, and the standard value for a feature is generated by comparison of a raw value associated with that standardized entry for that feature to a condition associated with that feature;
identifying a potential root cause for the operational issue on a network device based on the standardized database; and
performing an action based on the identified potential root causes.

8. The system of claim 7, wherein each standardized entry comprises a symptomatic feature having a value assigned based on an occurrence of the operational issue in the network device corresponding to that standardized entry.

9. The system of claim 7, wherein the instructions are further for: detecting the operational issue on the network device and identifying the potential root cause based on the detection of the operational issue.

10. The system of claim 7, wherein each of the features is a behavioral feature or a configuration feature.

11. The system of claim 7, wherein identifying a potential root cause on the network device comprises performing rule mining on the standardized database.

12. The system of claim 11, wherein the rule mining comprises association rule mining.

13. A non-transitory computer readable medium, comprising instructions for:
obtaining a standardized database, wherein the standardized database comprises standardized entries corresponding to an occurrence of an operational issue, each standardized entry is associated with a corresponding network device and comprises standard values for each feature of that standardized entry, and the standard value for a feature is generated by comparison of a raw value associated with that standardized entry for that feature to a condition associated with that feature;
identifying a potential root cause for the operational issue on a network device based on the standardized database; and
performing an action based on the identified potential root causes.

14. The non-transitory computer readable medium of claim 13, wherein each standardized entry comprises a symptomatic feature having a value assigned based on an occurrence of the operational issue in the network device corresponding to that standardized entry.

15. The non-transitory computer readable medium of claim 13, wherein the instructions are further for: detecting the operational issue on the network device and identifying the potential root cause based on the detection of the operational issue.

16. The non-transitory computer readable medium of claim 13, wherein each of the features is a behavioral feature or a configuration feature.

17. The non-transitory computer readable medium of claim 13, wherein identifying a potential root cause on the network device comprises performing rule mining on the standardized database.

18. The non-transitory computer readable medium of claim 17, wherein the rule mining comprises association rule mining.

* * * * *